(12) United States Patent
Ifort

(10) Patent No.: US 7,137,181 B2
(45) Date of Patent: Nov. 21, 2006

(54) FLEXIBLE CABLE SLEEVE APPARATUS

(76) Inventor: Juan Triola Ifort, c/. Casino, No. 2, 38620 San Miguel de Abona, Santa Cruz de Tenerife (ES)

( * ) Notice: Subject to any disclaimer, the term of this patent is extended or adjusted under 35 U.S.C. 154(b) by 0 days.

(21) Appl. No.: 11/208,216

(22) Filed: Aug. 22, 2005

(65) Prior Publication Data

US 2006/0019534 A1    Jan. 26, 2006

Related U.S. Application Data

(63) Continuation-in-part of application No. 10/836,868, filed on May 3, 2004.

(51) Int. Cl.
  *B23P 19/02* (2006.01)
(52) U.S. Cl. ............... 29/235; 254/134.3 FT; 29/238
(58) Field of Classification Search ............ 29/235, 29/238, 239; 254/134.3 FT, 134.3 R
  See application file for complete search history.

(56) References Cited

U.S. PATENT DOCUMENTS 5,546,645 A * 8/1996 Baughman .......... 29/235
6,550,137 B1 * 4/2003 Ferrand .......... 29/868
6,757,950 B1 * 7/2004 Malone .......... 29/235
7,039,993 B1 * 5/2006 Smith et al. .......... 29/235
2004/0093708 A1 * 5/2004 Malone .......... 29/235

* cited by examiner

*Primary Examiner*—Lee D. Wilson
(74) *Attorney, Agent, or Firm*—Sanchelima & Assoc., PA

(57) ABSTRACT

A tool for mounting a flexible slotted sleeve to hold more than one cable/wire together. The sleeve includes repetitive cuts cooperatively positioned to enhance the flexibility of the sleeve. The tool includes a slotted tubular member with a longitudinal slot through which the wires and cables are passed to be temporarily received within the slotted tubular member. A cylindrical member is mounted to the slotted tubular member, at an angle, with a distal rounded closed end and an open end that coincides into one of the open ends of the slotted tubular member. As the slotted sleeve is brought against the rounded closed end, its slot is opened and travels open towards the open end where the cables are. After leaving the open end of the slotted tubular member, the slotted sleeve is released embracing the cables to be protected.

4 Claims, 3 Drawing Sheets

FLEXIBLE CABLE SLEEVE APPARATUS

OTHER RELATED APPLICATIONS

The present application is a continuation-in-part of pending of U.S. patent application Ser. No. 10/836,868, filed on May 3, 2004, which is hereby incorporated by reference.

BACKGROUND OF THE INVENTION

1. Field of the Invention

The present invention relates to an apparatus for mounting a flexible cable sleeve over more than one cable or wire for removably holding them.

2. Description of the Related Art.

Applicant is not aware of the existence of an apparatus for inserting the cables to be protected within a sleeve.

Applicant knows of the existence of cable ducts, channels and surface raceways mountable to the base of walls and partitions for conventional wire enclosure applications, including telecommunication cabling. These cable ducts and raceways may be opened by removing the outer sections to allow the removal and insertion of cables. These cable ducts and raceways are permanent fixtures and do not typically allow the incorporation of cables from conventional electrical household appliances which are shorted in length. The appliances' loose cables such as lamps, speakers, audio/visual equipment, computers, printers, etc., represent a potential safety hazard when located near radiators, over floors or trapped under furniture. Several sleeve assemblies have been designed in the past for holding cables. However, there is no suitable device for releasably mounting an enclosure for cables. The cable enclosures of the prior art are not flexible, making it difficult to rotate the protected cables.

Applicant believes that a related references corresponds to French Patent No. 2,699,013, issued to Jean-Claude Douchet on Jun. 10, 1994, for an annular shaped raceway for the accommodation of electrical cables, formed with readily detachable components. However, it differs from the present invention because Douchet's patented invention does not provide for an apparatus for the insertion of cables within the sleeve as in the present invention.

Applicant believes that another related reference corresponds to French Patent No. 2,744,280, issued to Beaulat Bernard on Aug. 1, 1997 31, 1996, for a sheath for wiring bundles formed by a laminar shell wound to form a spiral to accommodate cables.

Applicant believes that another related reference corresponds to U.S. Pat. No. 4,018,983, issued to J. Watson Pedlow on Apr. 19, 1977, for a plastic tubular sheath, which, when it is longitudinally overlapped, allows the accommodation of electrical and telephone cables, and the like.

Applicant believes that another related reference corresponds to U.S. Pat. No. 6,012,494, issued to Matthias Balazs on Jan. 11, 2000, for an flexible structure, which houses and protects electrical cables.

None of these references, however, includes a device that allows the user easily mount cable sleeves to cables and wires protect them. The present invention provides for a tool to readily accomplish this.

Other patents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a device for readily mounting the sleeve to the cables and/or wires.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
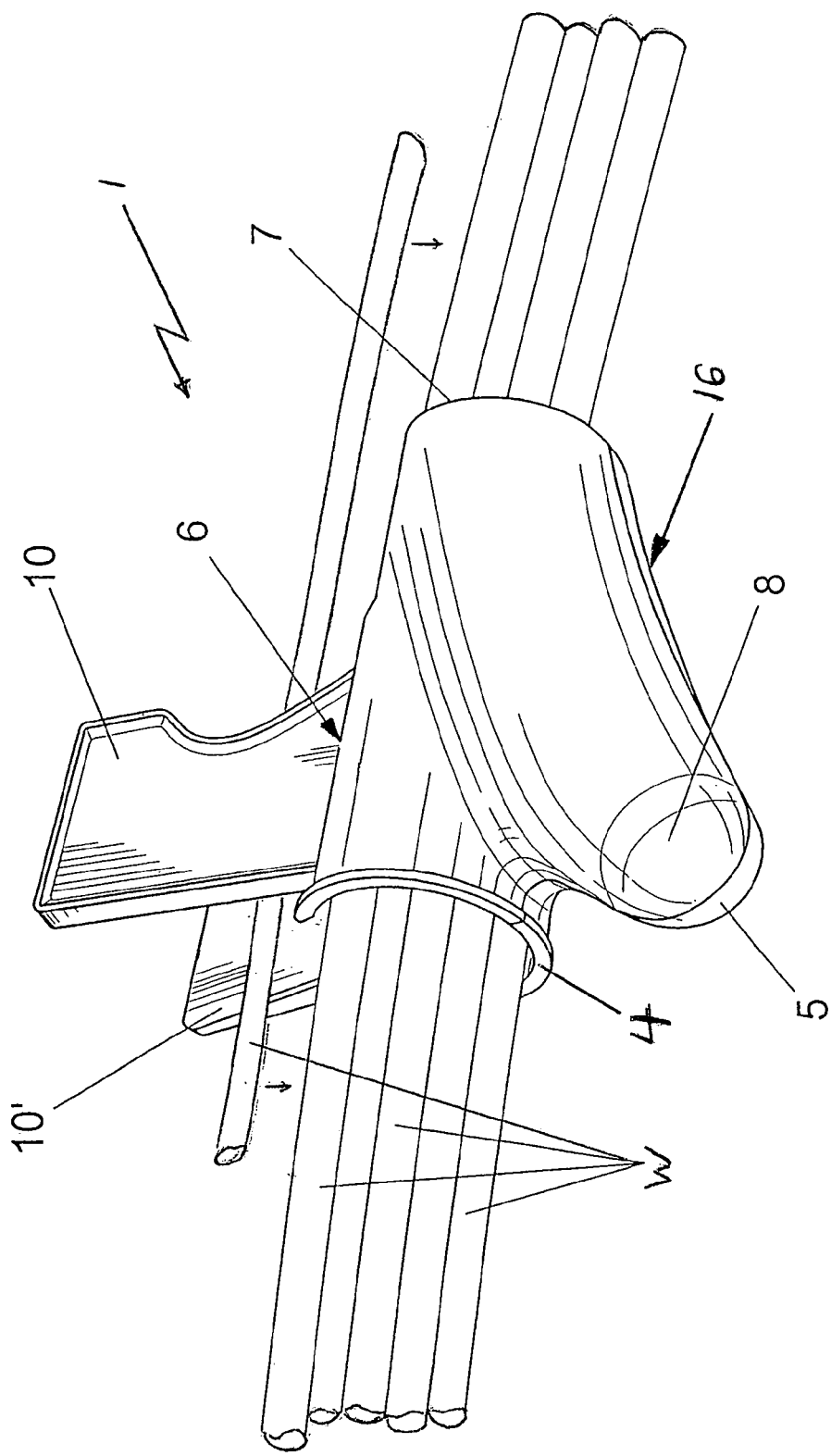
FIG. 1 represents an isometric view of the apparatus object of the present application holding several cables and ready to accept the sleeve assembly.

Referring now to the drawings, where the apparatus or tool subject of the present application is generally referred to with numeral 1, it can be observed that it basically includes slotted tubular member 6 with handle members 10 and 10' extending radially outwardly from the edge of slot 6'. Members 10 and 10' are preferably kept at a cooperative parallel and spaced apart relationship to facilitate a user's grip handle members 10 and 10' that extend outwardly from slotted tubular member 6. Cylindrical portion 16 extends from tubular member 6 at an angle of approximately 30 degrees, in the preferred embodiment, as seen in FIG. 1. The angle can be between 15 and 60 degrees with substantially similar results.

Figure 3:
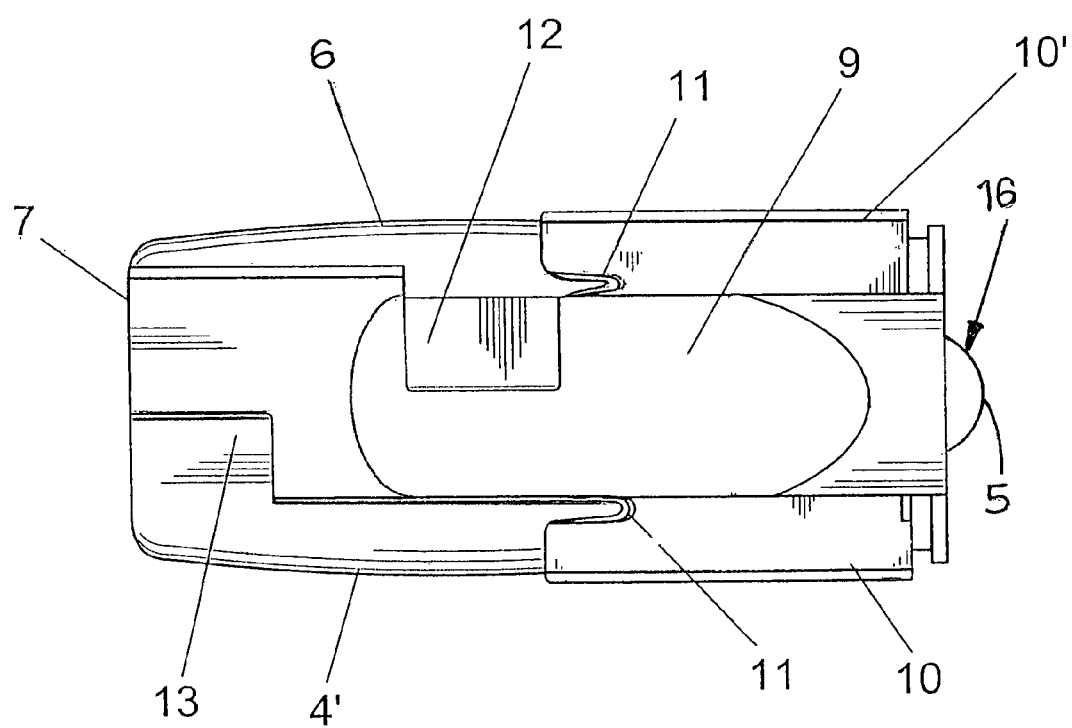
FIG. 3 is a top view of the cable sleeve apparatus represented object of the present application.

Member 6 has a substantially tubular shape with a longitudinal slot 6' and ends 4 and 7. Tubular member 6 has longitudinally extending edges x; x' defining slot 6' in between to allow cables or wires W to pass through. Tabs 12 and 13 alternate extend from the opposite open edges x and x' of tubular body 6 next to end 7, as best seen in FIG. 3. Tabs 12 and 13 prevent cables or wires W from coming outside tubular member 6 while sleeve 30 is mounted.

Figure 2:
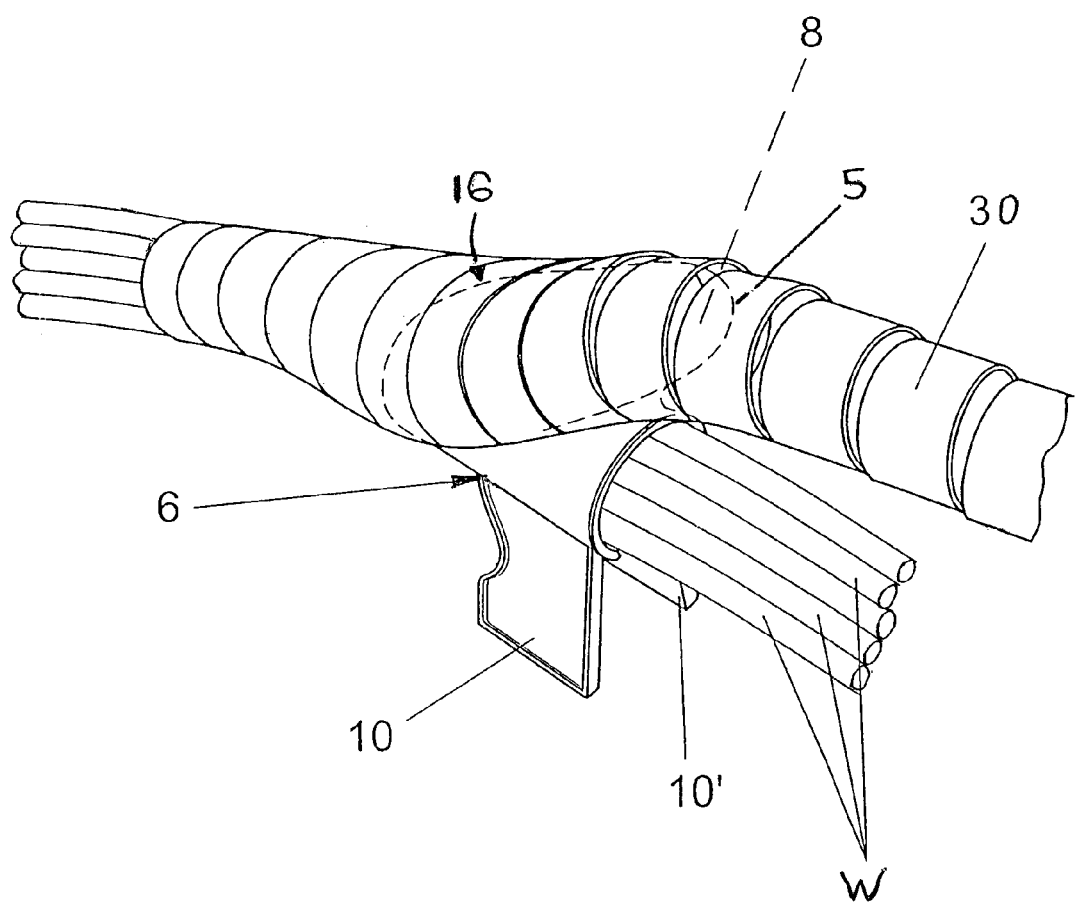
FIG. 2 shows an isometric view of the cable sleeve apparatus represented in FIG. 1, receiving the sleeve assembly and mounting it to the cables.

As shown in FIG. 1, cylindrical portion 16 includes rounded termination 8 at front end 5. The other end of cylindrical portion 16 is open and coincides with end 7 of slotted tubular member 6. Rounded termination 8 provides a round surface that cooperates to cammingly initiate the separation of the longitudinal edges y and y' of slotted flexible sleeve 30, as best seen in FIG. 2.

To mount flexible sleeve 30 to wires W, a user holds cable sleeve mounting apparatus 1 by one of handle members 10 or 10' and inserts wires W inside tubular member 6 through its longitudinally slot 6', as shown in FIG. 1. As best seen in FIG. 2, when sleeve mounting apparatus 1 has a wires W inside member 6, the user grabs both handle members 10 and 10' and brings one end of slotted sleeve 30 against rounded end 5 causing the former to cammingly separate its longitudinally extending edges y and y'. As sleeve 30 advances towards wires W it is released, embracing wires W.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A tool for mounting a flexible slotted sleeve with two longitudinally extending sleeve edges over at least two cables, comprising:
    A) a slotted tubular member having first and second open ends and a longitudinally extending slot defined by first and second opposed longitudinally extending edges, said slot having cooperative dimensions to permit cables to pass therethrough to be received within said tubular member;
    B) first and second handle members rigidly mounted to said first and second edges, respectively, and extending radially outwardly therefrom;
    C) a cylindrical member having a rounded closed end and a third open end, said third open end coinciding with said first end, and said rounded closed end protruding outwardly at a predetermined angle from said slotted tubular member to cammingly separate said sleeve edges as said sleeve is brought against said rounded closed end and caused to advance towards said first end to embrace said at least two cables.

2. The tool set forth in claim 1 wherein said predetermined angle is between 15 and 60 degrees.

3. The tool set forth in claim 1 wherein said first and second opposed longitudinally extending edges include at least one tab member for preventing the cables received inside said slotted tubular member from coming out where said sleeve is being mounted over said at least two cables.

4. The tool set forth in claim 3 wherein said predetermined angle is approximately 30 degrees.

* * * * *